(12) United States Patent
Williams et al.

(10) Patent No.: US 12,492,544 B2
(45) Date of Patent: *Dec. 9, 2025

(54) CROSSFLOW SETTING DEVICES AND METHODS OF USE

(71) Applicant: Stormtrap, LLC, Romeoville, IL (US)

(72) Inventors: Gregory Williams, London (CA); Dan Fajman, Minooka, IL (US); Robert J. Moran, Caldwell, NJ (US); Luke Matteson, Marseilles, IL (US)

(73) Assignee: Stormtrap, LLC, Romeoville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,159

(22) Filed: Apr. 26, 2024

(65) Prior Publication Data

US 2024/0271408 A1  Aug. 15, 2024

Related U.S. Application Data

(63) Continuation of application No. 17/810,782, filed on Jul. 5, 2022, now Pat. No. 12,000,134.

(51) Int. Cl.
*E03F 5/14* (2006.01)
(52) U.S. Cl.
CPC ..................................... *E03F 5/14* (2013.01)
(58) Field of Classification Search
CPC ....... E03F 1/00; E03F 5/10; E03F 3/04; E03F 3/02; E03F 5/106; E03F 1/001; E03F 5/14

USPC ......................................................... 210/519
See application file for complete search history.

(56) References Cited

U.S. PATENT DOCUMENTS

| 2,638,177 | A | 5/1953 | Heindlhofer |
| 10,155,670 | B1 | 12/2018 | Happel |
| 10,662,637 | B2 | 5/2020 | Moran et al. |
| 2005/0184007 | A1 | 8/2005 | Allard et al. |
| 2005/0194310 | A1 | 9/2005 | Yamamoto et al. |
| 2007/0187321 | A1 | 8/2007 | Bjornson et al. |

OTHER PUBLICATIONS

International Search Report and Written Opinion of the International Searching Authority, dated Aug. 15, 2023, from corresponding International Application No. PCT/US2023/069587.

*Primary Examiner* — Ekandra S. Miller-Cruz
(74) *Attorney, Agent, or Firm* — GREENBERG TRAURIG LLP (57) ABSTRACT

A stormwater treatment device may include a crossflow settling device having a treatment channel defined by a front baffle, a rear baffle, and a pairs angled plates provided at supplementary angles therebetween and disposed between the front baffle and the rear baffle, the front baffle having a treatment channel opening and the rear baffle having a treatment channel outlet. Under normal flow, stormwater flows into the inlet and into the inlet chamber, into the treatment channel via the treatment channel opening, into the outlet chamber via the treatment channel outlet in a crossflow pattern causing the sediment to fall out of suspension, and out of the crossflow setting device through openings at the bottom of the pairs of angled plates.

19 Claims, 7 Drawing Sheets

CROSSFLOW SETTING DEVICES AND METHODS OF USE

RELATED APPLICATIONS

This application is a Continuation of U.S. patent application Ser. No. 17/810,782, now U.S. Pat. No. 12,000,134 filed Jul. 5, 2022, the disclosure of which is hereby incorporated by reference its entirety.

BACKGROUND OF THE INVENTION

1. Field of the Invention

The present disclosure relates generally to crossflow settling devices and methods of use.

2. Description of the Related Art

When it rains, stormwater travels over a variety of surfaces before it reaches a sewer. Along its path, the stormwater picks up and suspends contaminants, both natural and man-made, and carries the contaminants to the sewer. The sewer provides a first opportunity to remove some of these contaminants from the stormwater before the stormwater continues its journey to a body of water.

SUMMARY OF THE INVENTION

Crossflow settling devices and methods of use are disclosed.

According to an embodiment, a stormwater treatment device, may include a housing having a floor and a wall; an inlet formed in the wall that receives stormwater including suspended sediment into an inlet chamber of the housing, the inlet chamber defined by a first portion of the wall and a front baffle, the front baffle extending vertically from the floor of the housing; an outlet formed in the wall that discharges stormwater from an outlet chamber of the housing, the outlet chamber defined by a rear baffle, a second portion of the wall, and a short circuit prevention plate; and a treatment chamber and settlement storage area defined by the front baffle, a third portion of the wall, the rear baffle, and the short circuit prevention plate and having a crossflow settling device disposed therein, the crossflow setting device having a treatment channel defined by the front baffle, the rear baffle, and a first pair of angled plates disposed on a first side of a centerline of the housing, and a second pair of angled plates disposed on a second side of the centerline, the first pair of angled plates and the second pair of angled plates provided at supplementary angles therebetween, the first pair of angled plates and the second pair of angled plates disposed between the front baffle and the rear baffle, the front baffle having a treatment channel opening and the rear baffle having a treatment channel outlet. Under normal flow, stormwater flows into the inlet and into the inlet chamber, into the treatment channel via the treatment channel opening, into the outlet chamber via the treatment channel outlet, wherein the stormwater flows in a crossflow pattern causing the sediment to fall out of suspension, and out of the crossflow setting device through openings at the bottom of the pairs of angled plates.

In one embodiment, the stormwater treatment device may also include a bypass channel comprising an inlet weir, an outlet weir, and a pair of bypass channel walls, wherein an elevation of a top of the inlet weir is the same as the elevation of a notch in the outlet weir between the bypass channel walls but below an elevation of the top of the outlet weir, outside the bypass channel, below an elevation of the bypass channel walls, wherein the bypass channel receives a flow over the inlet weir when a flow exceeds a limit, thereby bypassing the treatment chamber and settlement storage area.

In one embodiment, under high flow, stormwater flows over the inlet weir and either into the bypass channel and over the notch in the outlet weir and into the outlet chamber, and out of the housing via the outlet or into a floatables retention zone between the bypass channel walls and a third portion of the wall.

In one embodiment, the supplementary angles may be between about 45/145 degrees and about 65/115 degrees.

In one embodiment, a width of each of the plates may be less than a length of the plates.

In one embodiment, a spacing between the pairs of plates may be between 1 and 4 inches.

According to another embodiment, a method for removing suspended sediment from stormwater may include: (1) receiving, at an inlet in a wall of a stormwater treatment device having a housing with a floor and a wall, stormwater comprising suspended sediment, wherein the stormwater flows into an inlet chamber defined by a first portion of the wall and a front baffle, the front baffle extending vertically from the floor of the housing; (2) receiving, in a treatment chamber defined by a front baffle, a second portion of the wall, a rear baffle, and a bypass prevention plate and having a crossflow settling device disposed therein, the stormwater comprising suspended sediment; (3) receiving, by the crossflow setting device having a treatment channel defined by the front baffle, the rear baffle, and a first pair of angled plates disposed on a first side of a centerline of the housing, and a second pair of angled plates disposed on a second side of the centerline, the first pair of angled plates and the second pair of angled plates provided at supplementary angles therebetween, the first pair of angled plates and the second pair of angled plates disposed between the front baffle and the rear baffle, the front baffle having a treatment channel opening and the rear baffle having a treatment channel outlet, stormwater comprising suspended sediment; (4) causing, by the crossflow setting device and under normal flow rates, the stormwater to flow in a crossflow pattern that causes the sediment to fall out of suspension and out of the crossflow setting device through openings at bottom of the pairs of angled plates; (5) receiving, in an outlet chamber defined by the rear baffle, a second portion of the wall, and a short circuit prevention plate, stormwater with a portion of the sediment removed; and (6) discharging, by an outlet in a third portion of the wall, the stormwater with the sediment removed.

In one embodiment, the method may also include receiving, under high flow, stormwater with sediment into a bypass channel, the bypass channel comprising an inlet weir, an outlet weir, and a pair of bypass channel walls, wherein an elevation of a top of the inlet weir is the same as an elevation of the top of a notch in the outlet weir and below an elevation of a top of the outlet weir and tops of the bypass channel walls, wherein the bypass channel receives a flow over the inlet weir when a flow exceeds a limit, thereby bypassing the treatment chamber and settlement storage area, wherein the stormwater with sediment flows over an inlet weir and into the bypass channel and over a notch in the outlet weir and into the outlet chamber, and out of the housing via the outlet. In one embodiment, under high flow, some stormwater flows over the inlet weir and into a floatables retention zone between the bypass channel walls and a third portion of the wall.

In one embodiment, floatables may be retained in the floatables retention zone.

In one embodiment, under a very high flow, floatables may overflow the outlet weir and the bypass channel walls into the outlet chamber.

In one embodiment, the supplementary angles may be between about 45/145 degrees and about 65/115 degrees.

In one embodiment, a width of each of the plates may be less than a length of the plates.

In one embodiment, a spacing between the pairs of plates may be between about 1 inch and 4 inches.

In one embodiment, a water treatment device may receive the water, such as stormwater including suspended sediment, into an inlet chamber. The inlet chamber may include one or more flow diverters that direct all flow, up to a specified treatment flow rate, into a treatment zone of the treatment chamber. The water may then flow to a treatment zone of a treatment chamber that may include a crossflow device including one or more pairs of parallel plates at supplementary angles between, for example, about 45/135 degrees and about 65/115 degrees and having a spacing between the tops of the plates, the plates suspended between two opposing spaced-apart substantially vertical weirs. The water may flow across the plates in a crossflow pattern, and the water may exit the treatment chamber into an outlet chamber.

In one embodiment, the plates may have an axis of symmetry between them parallel to the length of the plates.

In one embodiment, the length of the plates may be greater than or equal to about four feet, the width of the plates may be less than the length of the plates, and the spacing between the plates may be between about one and four inches.

In one embodiment, water in excess of a design flow rate may flow through the inlet chamber and over the top of the treatment chamber, where the treatment chamber includes a system of weirs deigned to retain floatable materials at flows above the treatment flow and below an excess bypass flow. The weirs may form a center trough that may be, for example, around two to three feet wide, and a wall between the treatment and outlet chambers that extends the width of the outlet side may be provided. The top of the weir may be, for example, at least about 18 inches above the top of the inclined plates. A notch may be provided in the weirs at the inlet and outlet sides of the trough, the notch may be lower than the top of the sides of the trough and the wall at the outlet side. Water may enter the trough and be conveyed directly to the outlet chamber at flows above the designed treatment flow rate but below the excess bypass flow rate.

In one embodiment, captured sediment may be stored the floor of the chamber. A baffle may be provided between the inlet chamber and the treatment chamber, and the baffle may extend from the bottom of the inclined plates to the floor of the vault, thereby preventing movement of stored sediment from the inlet chamber to the treatment chamber. A second baffle may extend between the sediment chamber and outlet chamber to either the floor of the vault or to the back wall of the chamber, thereby preventing movement of stored sediment from the treatment chamber to the outlet chamber.

According to another embodiment, a separator assembly may include an inclined cell separator having a plurality of rectangular plates positioned between opposing spaced-apart substantially vertical weirs, the plates having opposing elongated top and bottom edges and front and rear surfaces therebetween, the plates having an inclined orientation relative a vertical axis, the plates being arranged in pairs at supplementary angles, the plates having an axis of symmetry between them parallel to the length of the plates, said inclined orientation forming angled cells between adjacent plates of the plurality, the weirs comprising an inlet weir and an outlet weir being substantially parallel to one another, the inlet and outlet weirs having opposing top and bottom edges and front and rear surfaces therebetween; the inclined cell separator being located within a chamber formed by opposing end walls, opposing side walls, a top and a bottom, the opposing end walls comprising an influent wall having an influent opening therein and an effluent wall having an effluent opening therein, the inlet and outlet weirs extending between the opposing side walls of the chamber; an influent chamber between the influent wall and the inlet weir; an effluent chamber between the outlet weir and the effluent wall; and a sediment collection area along the bottom of the chamber below the inclined cell separator and between the influent chamber and effluent chamber.

In one embodiment, the inclined plates may be arranged in pairs at supplementary angles between about 45/135 degrees and about 65/115 degrees with a space between the tops of the plates of about at least four inches.

In one embodiment, the length of the plates in the flow direction may be greater than or equal to around four feet, the width of the plates may be less than the length of the plates, and the spacing between the plates may be between about one and four inches.

In one embodiment, the bottom edge of the first weir may extend to the bottom of the chamber, and a portion of the top edge of the weir may be at the same level as the top of the cell separator, and a portion of the first weir may form a tab extending some distance above the top of the cell separator.

In one embodiment, the top of the cell separator may be substantially horizontally level with inverts of the influent and effluent openings.

In one embodiment, two substantially parallel plates may extend from the sides of the tab in the first weir to the notch in the second weir. The top edge of these walls may extend as far as the top of the second weir and these walls define an overflow path from the tab in the first weir to the notch in the second weir.

BRIEF DESCRIPTION OF THE DRAWINGS

For a more complete understanding of the present disclosure, the objects and advantages thereof, reference is now made to the following descriptions taken in connection with the accompanying drawings in which.

DETAILED DESCRIPTION OF PREFERRED EMBODIMENTS

Embodiments are directed to crossflow settling devices and methods of use. Embodiments may cause a crossflow pattern of stormwater to remove sediment and use a small distance for sediment to fall when it comes out of suspension. For example, the sediment need only fall to the surface of a plate.

FIGS. 1 to 5 illustrate views of a treatment device including a crossflow settling device according to embodiments. Treatment device 100 may include housing 105. Housing 105 may include inlet 110 that may receive, for example, stormwater with suspended sediment, and outlet 115 that may outlet stormwater. Water received at inlet 110 may flow into inlet chamber 170, may flow into treatment chamber and sediment storage area 120, may flow into outlet chamber 175, and may exit treatment device 100 via outlet 115.

Treatment chamber and sediment storage area 120 may be defined by front baffle 130, rear baffle 125, and short circuit prevention plate 165.

Housing 105 may include a crossflow settling device including a plurality of pairs of angled plates 135 disposed between front baffle 130 and rear baffle 125. In one embodiment, two pairs of angled plates 135 may be provided, one on each side of a centerline of housing 105. Pairs of angled plates 135 may be provided at supplementary angles therebetween, for example, 45/135 degrees and 65/115, and a space may be provided between the tops of the pairs of angled plates 135. Pairs of angled plates 135 may be suspended between inlet weir 140 and outlet weir 145. Bypass channel walls 155 may be provided which along with inlet weir 140 and outlet weir 145 provide an area to retain floatables (e.g., sediment or other material that floats on top of the water). Outlet weir 145 may be provided with notch 150 that may allow some water to flow into outlet chamber 175.

The top of inlet weir 140 and the top of notch 150 may have the same elevation and allow for normal flow bypass. The top of outlet weir 145 may be at a higher elevation that allows for bypass in high flow situations. Some floatables may go to the side, and some may escape.

At higher flows, floatables may flow with water over notch 150, into outlet chamber 175, and out of treatment device 100 via outlet 115.

Water with sediment enter a pair of treatment channel openings 190 in front baffle 130 that, with pair of angled plates 135 and treatment channel outlets 160 in rear baffle, create a treatment channel. Water in the treatment channel may flow between each pair of angled plates 135 with a crossflow pattern, which causes suspended sediment to settle through sediment outlet 180 into the bottom of treatment chamber and sediment storage area 120. Water than has had some sediment settle out of suspension may flow through treatment channel outlets 160 into outlet chamber 175.

Housing 105 may further include flow diverter 185 that may be provided by front baffle 130. In one embodiment, flow diverter may be attached or otherwise secured to front baffle 130. Flow diverter 185 may cause a flow water from inlet 110 to move to the sides of front baffle 130 and into treatment channel openings 190. Flow diverter 185 may also assist with floatable capture, in that floatables may be routed to the sides of bypass channel walls and retained.

Figure 1:
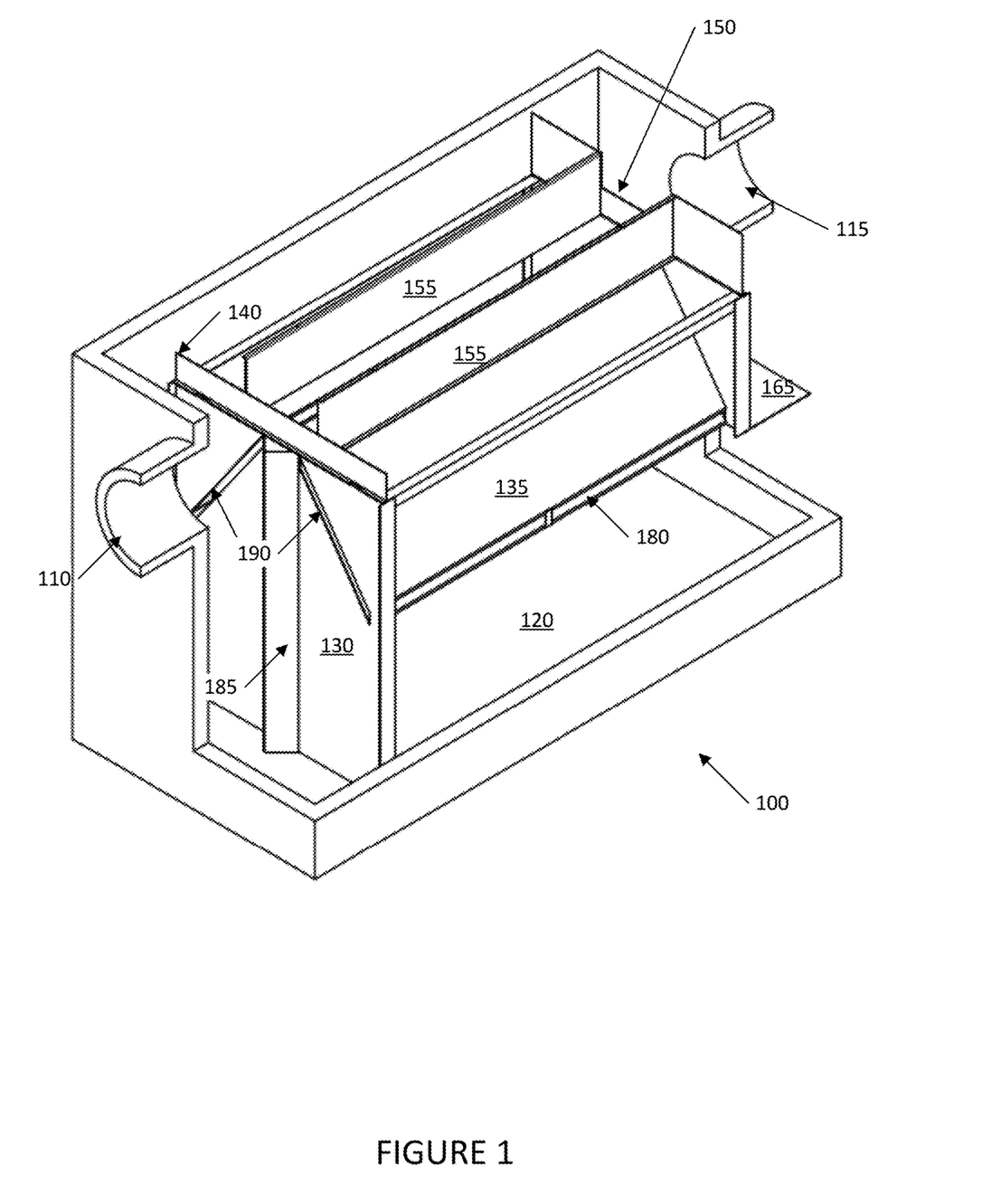
FIG. 1 depicts a first isometric view of a water treatment device including crossflow settling device according to an embodiment.
Figure 2:
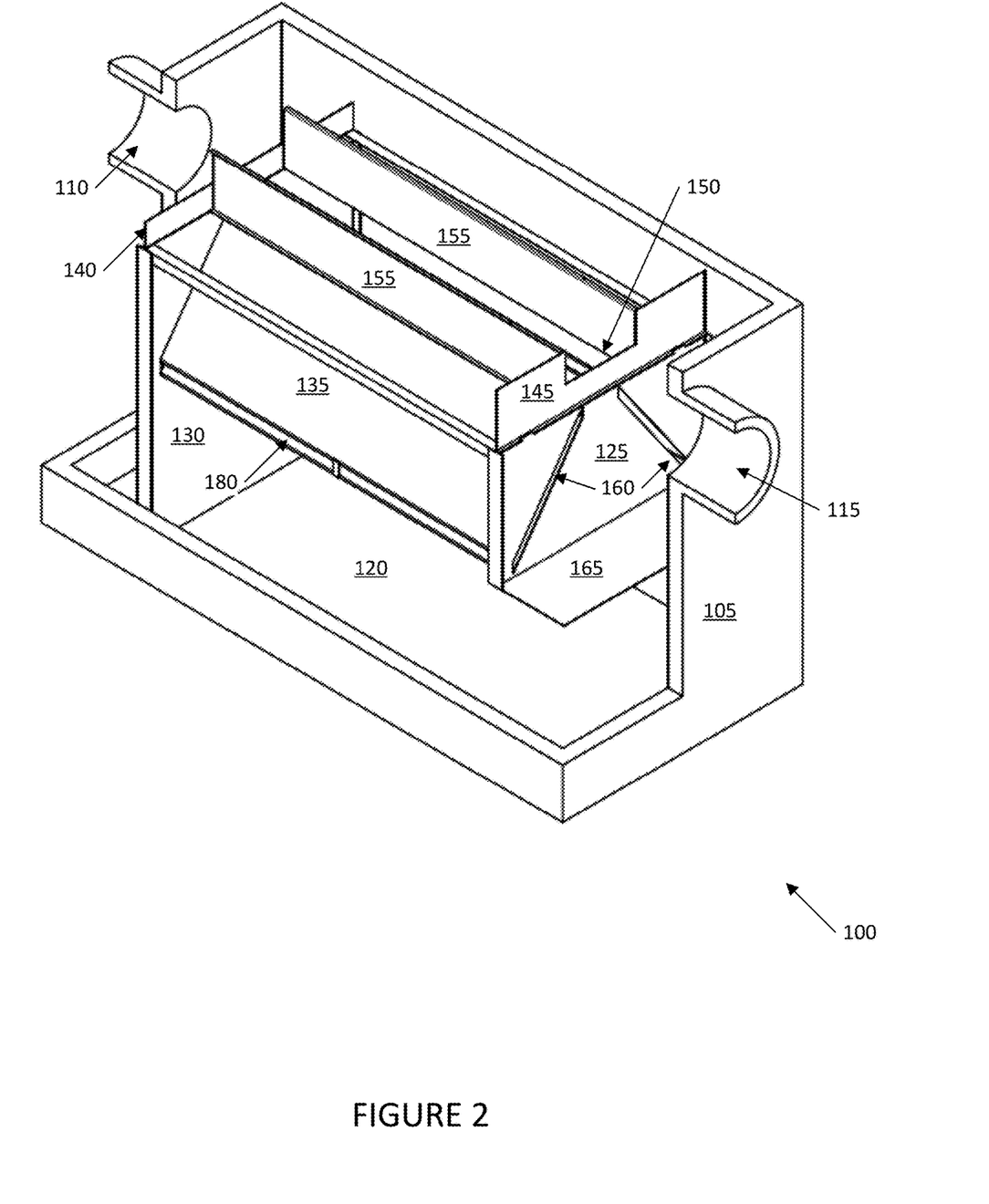
FIG. 2 depicts a second isometric view of a water treatment device including crossflow settling device according to an embodiment.
Figure 3:
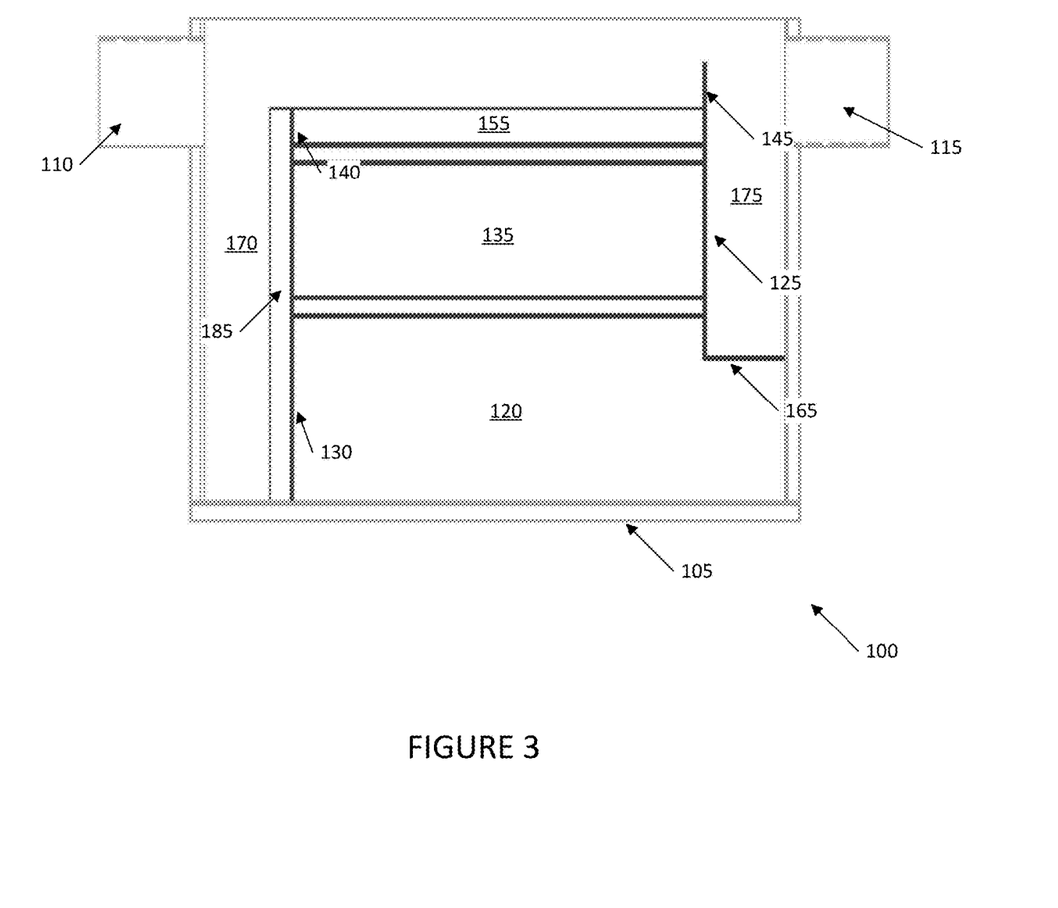
FIG. 3 depicts a side view of the water treatment device of FIGS. 1 and 2.
Figure 4:
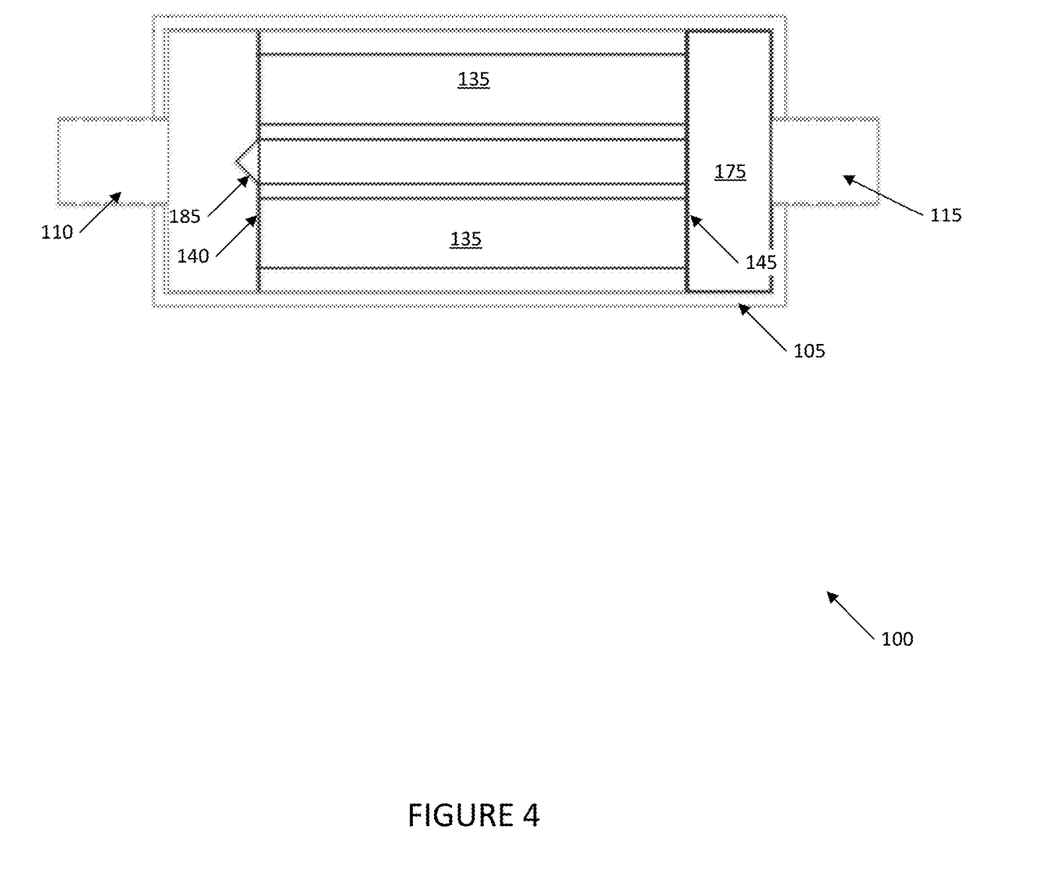
FIG. 4 depicts a side view of the water treatment device of FIGS. 1 and 2.
Figure 5:
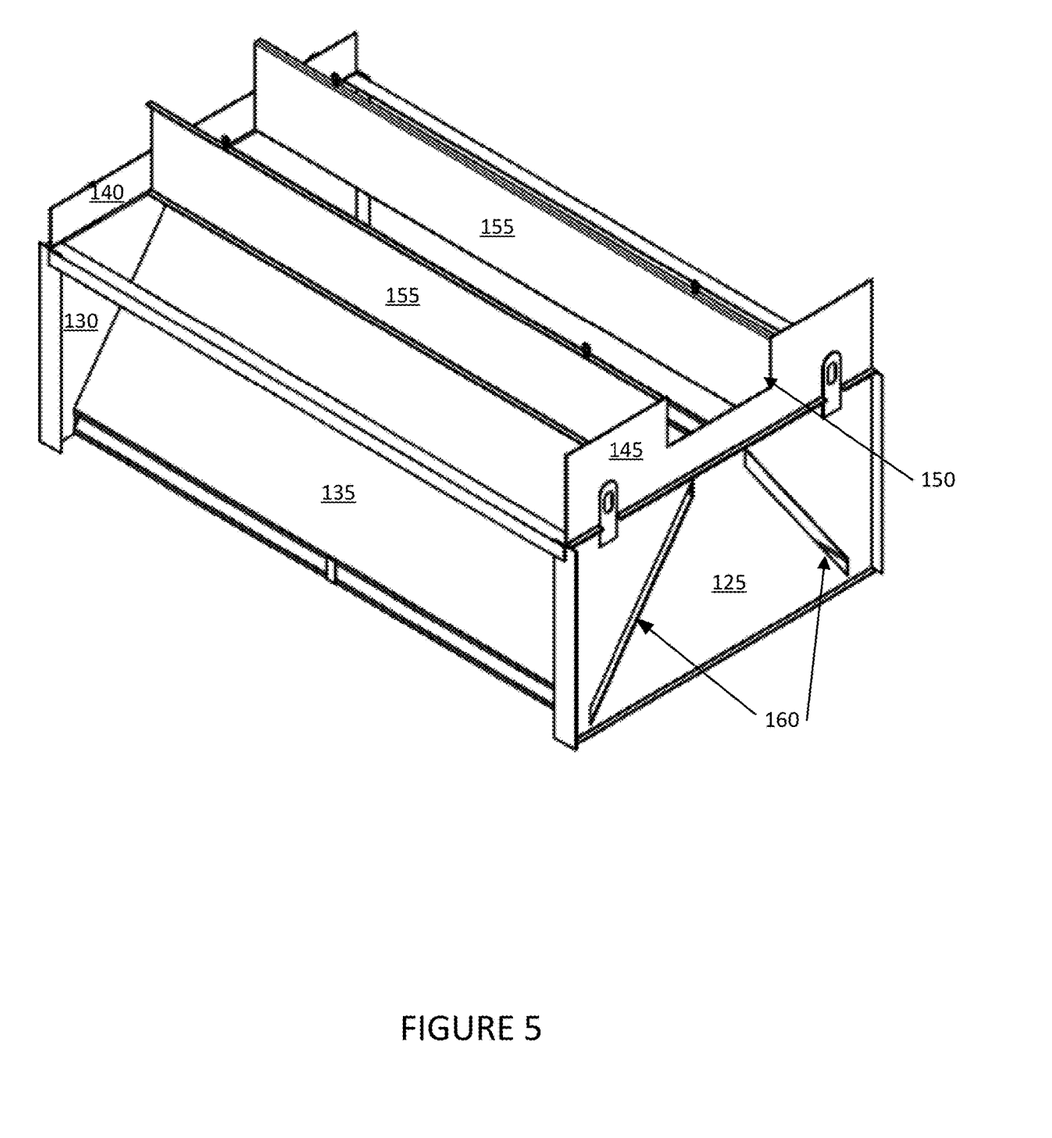
FIG. 5 depicts isometric view of a crossflow settling device according to an embodiment.
Figure 6:
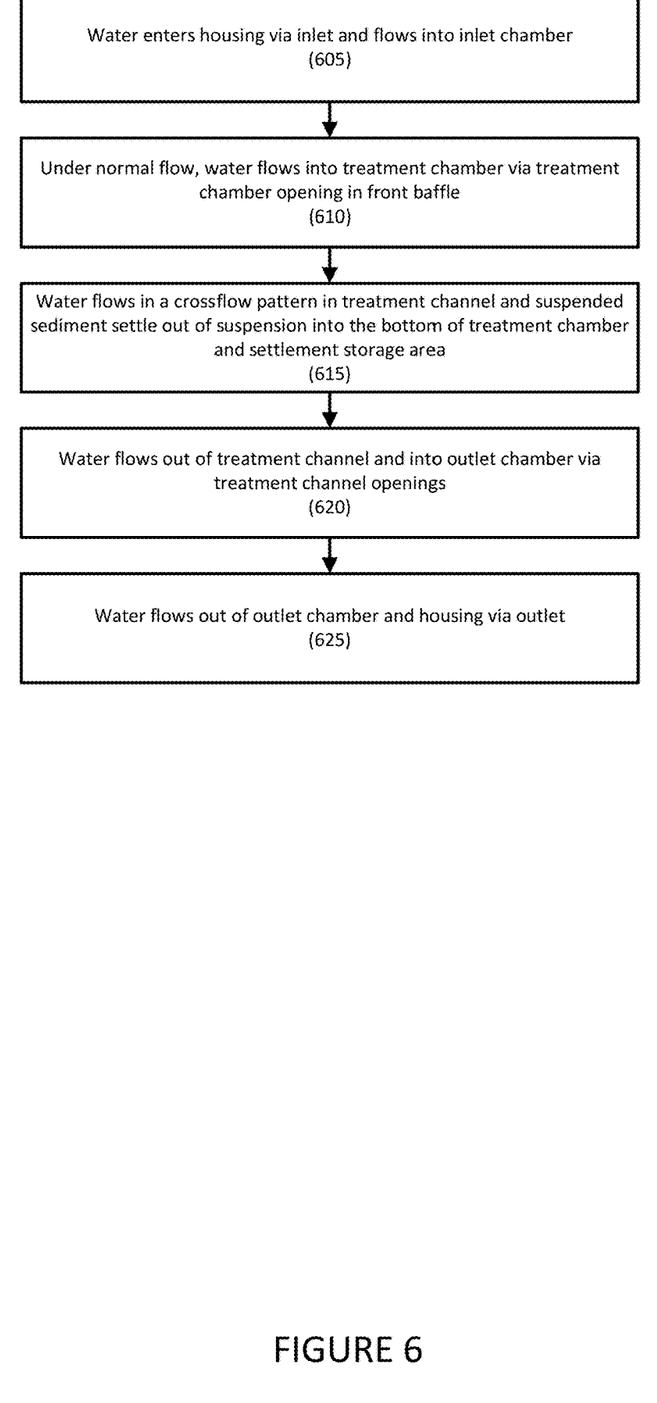
FIG. 6 depict a method of treating water with a water treatment device including a crossflow setting device according to an embodiment.

Referring to FIG. 6, a method for removing suspended sediment from stormwater is disclosed according to one embodiment.

In step 605, stormwater carrying suspended sediment flows into the inlet side of the stormwater treatment device into an inlet chamber, where an expansion allows the fluid velocity to decrease.

In step 610, under normal flow (e.g., within design limits), the water in the inlet chamber may flow into one or more treatment chamber openings and into a treatment channel defined by the front baffle, a pair of parallel plates, and treatment channel outlets in a rear baffle.

In step 615, the water flows in a crossflow pattern in the treatment channel, and suspended sediment settle out of suspension into the bottom of treatment chamber and settlement storage area. The sediment may fall out of the treatment channel via side openings between the pair of angled plates.

In step 620, treated water may flow out of the treatment channel and into outlet chamber via treatment channel openings in the rear baffle.

In step 725, the treated water may flow out of the outlet chamber and the housing via an outlet, such as a pipe.

Figure 7:
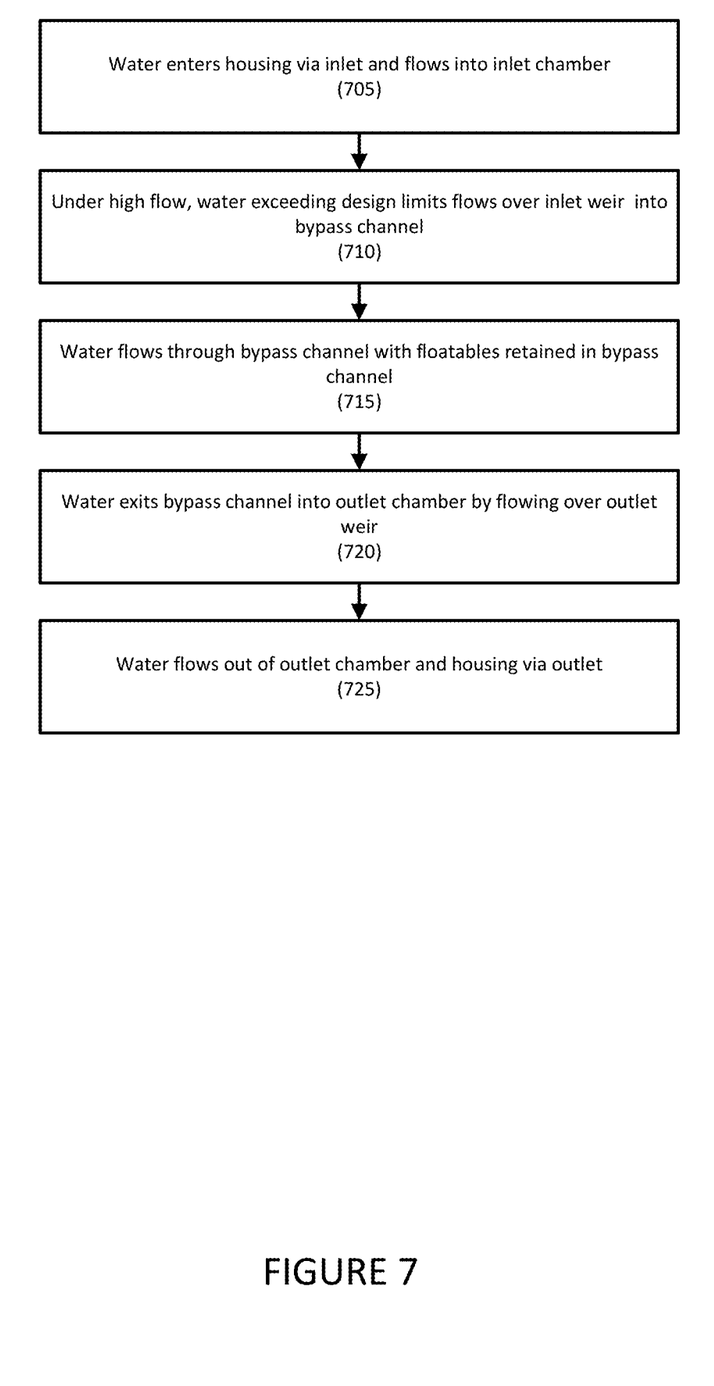
FIG. 7 depicts a method for bypassing a crossflow settling device is disclosed according to one embodiment.

Referring to FIG. 7, a method for bypassing a crossflow settling device is disclosed according to embodiments. For example, at high flows, the bypass channel and floatables retention zones may be active, and floatables may be retained in the bypass floatables retention zones. At very high flows, however, the entire outlet weir may be overtopped and all floatables may be washed out of the floatables retention zones.

In step 705, water may enter a housing via inlet, and may flow into an inlet chamber.

In step 710, when the flow rate exceeds design limits, the water flows over an inlet weir and into a bypass channel as well as two floatables retention zones. The bypass channel may be defined by the inlet weir, bypass channel walls, and an outlet weir. The floatables retention zones are defined by the inlet weir, the outside of the bypass channel walls, the walls of the housing and the outlet weir.

In step 715, at a high flow, water may flow through the bypass channel. Any floatables with the water may be retained within the floatables retention zones. Some water may exit over a notch in the exit weir into outlet chamber.

In step 720, the water may exit the bypass channel into outlet chamber by flowing over the outlet weir at the end of the bypass channel. At high flows, floatables within the bypass channel may exit with the water over the notch and into the outlet chamber.

In step 725, the water may flow out of the outlet chamber and housing via an outlet.

It will be appreciated by persons skilled in the art that the present invention is not limited by what has been particularly shown and described hereinabove. Rather the scope of the present invention includes both combinations and subcombinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A stormwater treatment device, comprising:
   a housing having a floor and a wall;
   an inlet formed in the wall that receives stormwater including suspended sediment into an inlet chamber of the housing, the inlet chamber defined by a first portion of the wall and a front baffle, the front baffle extending vertically from the floor of the housing;
   an outlet formed in the wall that discharges the stormwater from an outlet chamber of the housing, the outlet chamber defined by a rear baffle, a second portion of the wall, and a short circuit prevention plate; and
   a treatment chamber and settlement storage area defined by the front baffle, a third portion of the wall, the rear baffle, and the short circuit prevention plate and having a crossflow settling device disposed therein, the crossflow settling device having a treatment channel defined by the front baffle, the rear baffle, and a first pair of angled plates disposed on a first side of a vertical centerline of the housing, and a second pair of angled plates disposed on a second side of the vertical centerline, the first pair of angled plates and the second pair of angled plates diverging from the vertical centerline at an angle, the first pair of angled plates and the second pair of angled plates disposed between the front baffle and the rear baffle, the front baffle having a treatment channel opening and the rear baffle having a treatment channel outlet;
   wherein, under normal flow, the stormwater flows into the inlet and into the inlet chamber, into the treatment channel via the treatment channel opening, into the outlet chamber via the treatment channel outlet, wherein the stormwater flows in a crossflow pattern causing the sediment to fall out of suspension, and out of the crossflow settling device through openings at a bottom of the pairs of angled plates.

2. The stormwater treatment device of claim 1, further comprising:
   a bypass channel comprising an inlet weir, an outlet weir, and a pair of bypass channel walls, wherein an elevation of a top of the inlet weir is the same as the elevation of the outlet weir between the bypass channel walls but below an elevation of the top of the outlet weir, outside the bypass channel, and an elevation of the bypass channel walls, wherein the bypass channel receives a flow over the inlet weir when a flow exceeds a limit, thereby bypassing the treatment chamber and settlement storage area.

3. The stormwater treatment device of claim 2, wherein under high flow, the stormwater flows over the inlet weir and either into the bypass channel and over a notch in the outlet weir and into the outlet chamber, and out of the housing via the outlet or into a floatables retention zone between the bypass channel walls and a third portion of the wall.

4. The stormwater treatment device of claim 3, wherein under a very high flow, floatables overflow the outlet weir and the pair of bypass walls into the outlet chamber.

5. The stormwater treatment device of claim 1, wherein the first pair of angled plates and the second pair of angled plates are provided at an angle of about 35/145 degrees and about 65/115 degrees relative to the horizontal.

6. The stormwater treatment device of claim 1, wherein a width of each individual angled plate of the first pair of angled plates and of the second pair of angled plates is less than a length of the individual angled plates.

7. The stormwater treatment device of claim 1, wherein a spacing between the first pair of angled plates or the second pair of angled plates.

8. The stormwater treatment device of claim 1, further comprising:
   a flow diverter, wherein the flow diverter is positioned in the inlet chamber and directs the stormwater into the treatment channel.

9. A method for removing suspended sediment from stormwater, comprising:
   receiving, at an inlet in a wall of a stormwater treatment device having a housing with a floor and a wall, the stormwater comprising the suspended sediment, wherein the stormwater flows into an inlet chamber defined by a first portion of the wall and a front baffle, the front baffle extending vertically from the floor of the housing;
   receiving, in a treatment chamber and settlement storage area defined by a front baffle, a second portion of the wall, a rear baffle, and a bypass prevention plate and having a crossflow settling device disposed therein, the stormwater comprising the suspended sediment;
   receiving, by the crossflow settling device having a treatment channel defined by the front baffle, the rear baffle, and a first pair of angled plates disposed on a first side of a vertical centerline of the housing, and a second pair of angled plates disposed on a second side of the vertical centerline, the first pair of angled plates and the second pair of angled plates diverging from the vertical centerline at an angle, the first pair of angled plates and the second pair of angled plates disposed between the front baffle and the rear baffle, the front baffle having a treatment channel opening and the rear baffle having a treatment channel outlet, the stormwater comprising the suspended sediment;
   causing, by the crossflow settling device and under normal flow rates, the stormwater to flow in a crossflow pattern that causes the suspended sediment to fall out of suspension and out of the crossflow settling device through openings at a bottom of the pairs of angled plates;
   receiving, in an outlet chamber defined by the rear baffle, a second portion of the wall, and a short circuit prevention plate, the stormwater with a portion of the suspended sediment removed; and
   discharging, by an outlet in a third portion of the wall, the stormwater with the suspended sediment removed.

10. The method of claim 9, further comprising:
    receiving, under high flow, the stormwater with the sediment into a bypass channel, the bypass channel comprising an inlet weir, an outlet weir, and a pair of bypass channel walls, wherein an elevation of a top of the inlet weir is the same as an elevation of the top of a notch in the outlet weir and below an elevation of a top of the outlet weir and tops of the bypass channel walls, wherein the bypass channel receives a flow over the inlet weir when a flow exceeds a limit, thereby bypassing the treatment chamber and settlement storage area, wherein the stormwater with the sediment flows over an inlet weir and into the bypass channel and over a notch in the outlet weir and into the outlet chamber.

11. The method of claim 10, wherein under high flow, some of the stormwater flows over the inlet weir and into a floatables retention zone between the bypass channel walls and a third portion of the wall.

12. The method of claim 11, wherein floatables are retained in the floatables retention zone.

13. The method of claim 12, wherein under a very high flow, the floatables overflow a notch in the outlet weir and the pair of bypass walls into the outlet chamber.

14. The method of claim 11, wherein the first pair of angled plates and the second pair of angled plates are provided at an angle of about 35/145 degrees and about 65/115 degrees relative to the horizontal.

15. The method of claim 11, wherein a width of each individual angled plate of the first pair of angled plates and of the second pair of angled plates is less than a length of the individual angled plates.

16. The method of claim 11, wherein a spacing between the first pair of angled plates or the second pair of angled plates is between about 1 inch and 4 inches.

17. The method of claim 9, wherein the stormwater is directed into the treatment channel by a flow diverter.

18. The stormwater treatment device of claim 1, wherein the first pair of angled plates and the second pair of angled plates diverge at the angle of between about 50 degrees and about 90 degrees.

19. The method of claim 9, wherein the first pair of angled plates and the second pair of angled plates diverge at the angle of between about 50 degrees and about 90 degrees.

* * * * *